(12) United States Patent
Abe

(10) Patent No.: US 8,057,731 B2
(45) Date of Patent: Nov. 15, 2011

(54) PROCESS OF FABRICATING THREE-DIMENSIONAL OBJECT

(75) Inventor: Satoshi Abe, Osaka (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 92 days.

(21) Appl. No.: 12/092,940

(22) PCT Filed: Nov. 14, 2006

(86) PCT No.: PCT/JP2006/322629
§ 371 (c)(1),
(2), (4) Date: May 7, 2008

(87) PCT Pub. No.: WO2007/058160
PCT Pub. Date: May 24, 2007

(65) Prior Publication Data
US 2009/0121393 A1    May 14, 2009

(30) Foreign Application Priority Data
Nov. 15, 2005    (JP) .................. 2005-330583

(51) Int. Cl.
*B29C 67/00*    (2006.01)
(52) U.S. Cl. ...................................... 264/497
(58) Field of Classification Search .............. 264/497; 419/6, 7
See application file for complete search history.

(56) References Cited

U.S. PATENT DOCUMENTS

| | | | |
|---|---|---|---|
| 2002/0041818 A1* | 4/2002 | Abe et al. | 419/7 |
| 2004/0099996 A1 | 5/2004 | Herzog | |
| 2004/0228754 A1* | 11/2004 | Abe et al. | 419/6 |
| 2005/0186538 A1 | 8/2005 | Uckelmann | |
| 2006/0157454 A1 | 7/2006 | Larsson | |
| 2009/0068616 A1 | 3/2009 | Uckelmann | |

FOREIGN PATENT DOCUMENTS

| | | |
|---|---|---|
| DE | 101 48 967 A1 | 4/2002 |
| DE | 102 08 150 A1 | 9/2002 |
| EP | 1 419 836 A1 | 5/2004 |
| EP | 1 568 472 A1 | 8/2005 |
| JP | 01-502890 A | 10/1989 |
| JP | 11-347761 A | 12/1999 |
| JP | 2002-038201 A | 2/2002 |
| WO | WO-88/02677 A2 | 4/1988 |
| WO | WO-2004/056509 A1 | 7/2004 |

OTHER PUBLICATIONS

International Search Report for the Application No. PCT/JP2006/322629 mailed Feb. 20, 2007.
Supplementary European Search Report for the Application No. EP 06 83 2591 dated Nov. 27, 2009.
Kruth, J. P. et al., "Progress in Additive Manufacturing and Rapid Prototyping", Annals of the CIRP, 1998, vol. 47, No. 2, pp. 525-540.

* cited by examiner

*Primary Examiner* — Christina Johnson
*Assistant Examiner* — Larry Thrower
(74) *Attorney, Agent, or Firm* — Cheng Law Group, PLLC

(57) ABSTRACT

A light beam is irradiated to sinter powder layers into a plurality of cured layer which are superimposed to each other to fabricate a three-dimensional object. A portion forming an outer shell of the object is given by high-density cured layers, while the other portion is given by low-density cured layers. The high-density cured layer making up at least a side of the object is composed of a high-density primary cured layer obtained by irradiation of a primary irradiation to the powder layer, and a high-density secondary layer obtained by a secondary irradiation to a supplemental powder layer supplied on the high-density primary cured layer. Thus, the high-density cured layer is given a height in level with the low-density cured layer, which assures constant height of each cured layer which is a combination of the high-density cured layer and the low-density cured layer.

10 Claims, 10 Drawing Sheets

FIG. 5
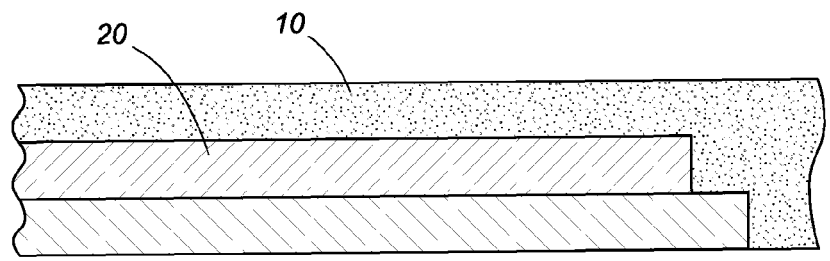
(A)
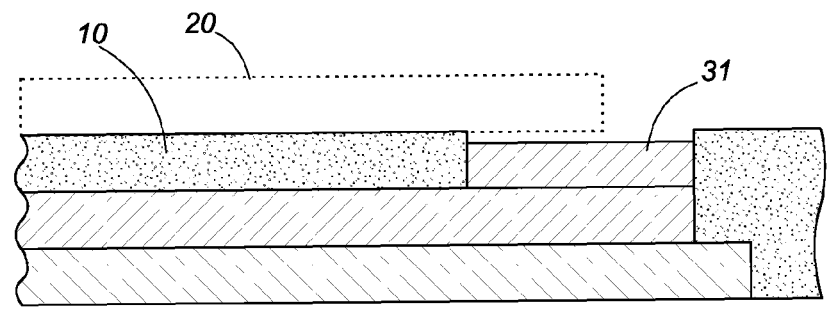
(B)
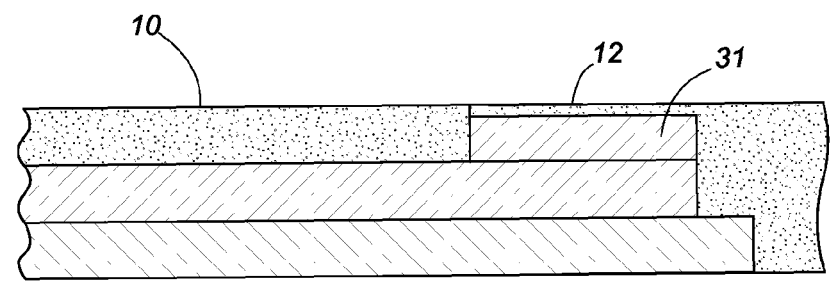
(C)
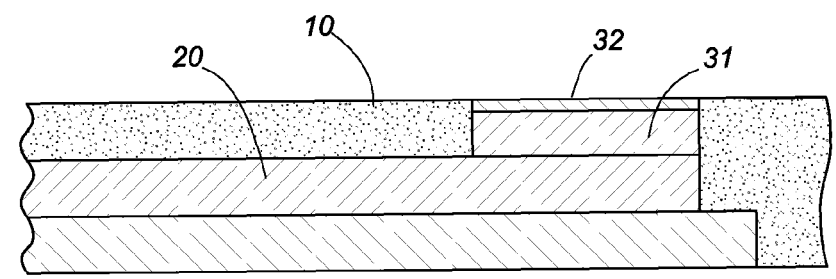
(D)
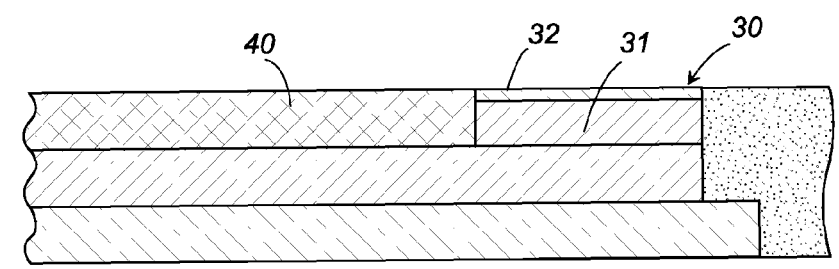
(E)

PROCESS OF FABRICATING THREE-DIMENSIONAL OBJECT

TECHNICAL FIELD

The present invention relates to a process of fabricating a desired three-dimensional object by stacking a plurality of cured layers each formed by irradiation of a light beam to a powder layer.

BACKGROUND ART

JP-A 01-502890 discloses a conventional process of fabricating a three-dimensional object. According to this process, the three-dimensional object is fabricated by repetition of a step of irradiating a light beam to a powder layer provided on an elevation stage to form a cured layer and a step of providing an additional powder layer on the cured layer and, then, irradiating the light beam to this powder layer to form a cured layer.

In consideration of problems concerning fabrication time, warp or crack due to an internal stress, and the like, preferably, the entire object is not finished under a uniform sintering condition at a uniform density, but only an outer shell of the object is formed as a high-density sintered portion under a high sintering condition while a remaining portion thereof is formed as a low density sintered portion under a low density condition.

A high-density sintered portion is formed by irradiation of a light beam to a powder layer under a high sintering condition, and has a density of nearly 100% in such a manner that the powder layer having a density in a range from 50 to 60% is melted and solidified nearly completely. After finishing, a surface of the high-density sintered portion becomes precise highly. However, the surface of the high-density sintered portion settles to be lower in height than that of a powder layer. Further, a degree of settling of the high-density sintered portion is higher than that of a low density sintered portion. Consequently, there is a difference in height between the high-density cured layer and the low-density cured layer. This difference in height is cumulated as a plurality of the cured layers stacked.

Such cumulated difference in height causes a significant problem when forming an inclined surface of the object. As shown in FIG. 12, an angle of the inclined surface is defined by a line K1 connecting upper end edges of stacked cured layers 20. As shown by dotted lines in FIG. 12, however, if each cured layer 20 becomes lower in height, a line K2 connecting the upper end edges of the cured layers 20 becomes gentler than the line K1. Consequently, an angle of inclination can not be obtained as designed, resulting in a problem that an object to be fabricated is degraded in precision.

DISCLOSURE OF THE INVENTION

The present invention has been devised in view of the conventional problem described above, and aims to provide a process capable of fabricating a three-dimensional object with high precision.

According to the present invention, a process of fabricating a three-dimensional object comprises the steps of:

a) providing a powder layer made of a powder material to have a uniform thickness;

b) irradiating a light beam to a selected portion of the powder layer to sinter or melt the selected portion into a cured layer;

c) providing an additional powder layer on the cured layer;

d) irradiating the light beam to a selected portion of the additional powder layer to form an additional cured layer consolidated with the cured layer; and e) repeating the steps of c) and d) in order to stack the cured layers to provide the three-dimensional object.

Upon formation of each cured layer, a primary irradiation is made to irradiate the light beam to an outline area of at least one of the powder layers forming an outer shell of the three-dimensional object in order to sinter or melt the outline area at a high-density into a high-density primary cured layer, an extra amount of the powder is supplied on top of the primary cured layer of which thickness is reduced as a result of being cured, so as to provide a supplemental powder layer of a uniform thickness, and a secondary irradiation is made to irradiate the light beam to the supplemental powder layer in order to sinter or melt at least one portion of the supplemental powder layer at a high-density into a high-density secondary cured layer consolidated to the primary cured layer. The light beam is irradiated to a remaining portion of the powder layer confined by the outline area and not converted into the primary cured layer in order to sinter or melt the portion at a low density into a low-density cured layer. As described above, when the two high-density cured layers are formed separately, the height of the high-density cured layer that defines the outer shell of the object can be made flush with the height of the low-density cured layer that defines the inner portion of the outer shell. Further, the respective cured layers including the high-density cured layer and the low-density cured layer can be made constant in height. Thus, the object having a precise shape can be fabricated as designed.

Preferably, the secondary irradiation is made to irradiate the light beam only to a portion of the supplemental powder layer not overlapping with a subsequently cured layer superimposed thereon so as to form the high-density secondary cured layer, and the primary irradiation is made to consolidate the portion of the supplemental powder layer overlapping with the subsequently superimposed cured layer into the high-density primary cured layer in the subsequently superimposed cured layer together with a powder layer supplied on the supplemental powder layer for the formation of the subsequently superimposed cured layer. Therefore, the range of the secondary irradiation of the light beam is limited only to the externally exposed portion of the object, so that a time required for the secondary irradiation can be reduced as much as possible. Thus, the object having a precise outer shape can be fabricated in a shorter time.

In the process according to the present invention, a vertically movable elevation stage is utilized to hold the cured layer, and is lowered step by step so as to be supplied with the powder material, thereby forming thereon the powder layer of uniform thickness. The powder material is supplied onto the primary cured layer with the elevation stage kept in a fixed level in order to readily prepare the supplemental powder layer of which top surface is in level with that of not-yet-sintered or not-yet-melted powder layer confined by the outline area.

In the process according to the present invention, desirably, the primary irradiation and the secondary irradiation are made to scan the light beams respectively in directions crossing with each other. With this scanning method, energy can be distributed to a selected area evenly, so that the surface of the resultant cured layer can be made smooth.

Also preferably, each of the primary irradiation and the secondary irradiation is made by the light beam with an irradiation energy which is constant per unit time as well as per unit volume of the powder being sintered or melted. Thus, the density of the high-density primary cured layer can be made equal to that of the high-density secondary cured layer.

In the process according to the present invention, for the formation of the cured layer not overlapping with the subsequently superimposed cured layer, that is, the cured layer exposed on the outer surface of the object, the light beam is irradiated to the high-density primary cured layer over an irradiation range which is different from an irradiation range over which the light beam is irradiated to form the high-density secondary cured layer, so that the outer shape of the object can be formed more precisely. In each of the respective cured layers each obtained from one powder layer, the edge of the high-density primary cured layer can be offset from that of the high-density secondary cured layer, so that the outer shape of the object can be defined more precisely by these two edges. In this case, the individual irradiation ranges of the primary irradiation and the secondary irradiation are determined by a settling thickness which is the thickness of the powder layer minus the thickness of the primary cured layer.

BRIEF DESCRIPTION OF THE DRAWINGS

FIGS. 5(A), 5(B), 5(C), 5(D) and 5(E) are enlarged sectional views each showing a step of forming the same inclined surface.

BEST MODE FOR CARRYING OUT THE INVENTION

Figure 1:
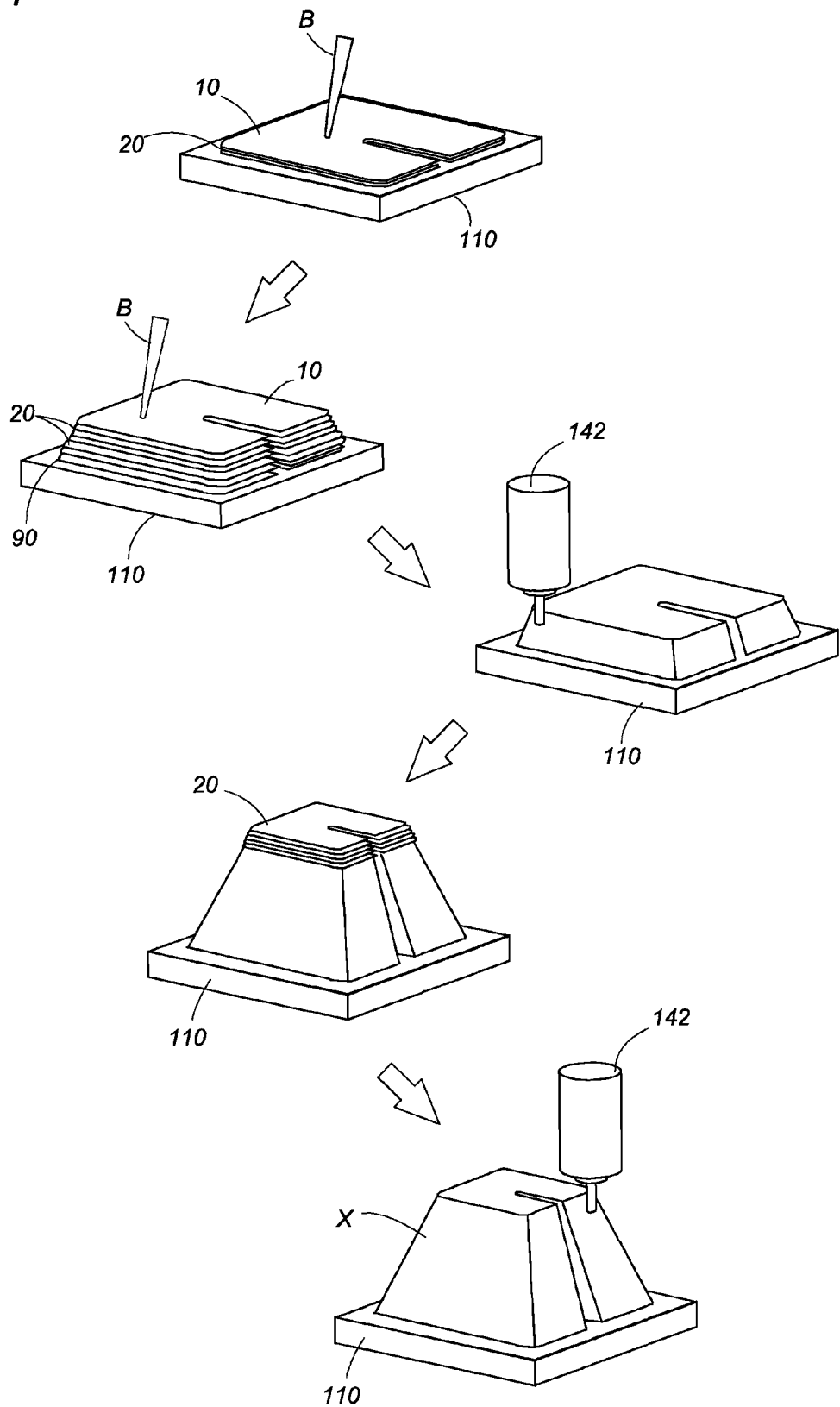
FIG. 1 schematically shows a process of fabricating a three-dimensional object according to one embodiment of the present invention.

Referring to the attached drawings, an explanation is made to a process of fabricating a three-dimensional object in accordance with one embodiment of the present invention. The method of the present invention is designed to repeat steps of irradiating a light beam such as a laser beam to a powder layer 10 of a powder material to form a cured layer 20, providing an additional powder layer 10 to thus obtained cured layer 20, and converting the additional powder layer 10 into a cured layer in the like manner, thereby fabricating the three-dimensional object X in which a plurality of the cured layers 20 are bonded and superimposed on each other. The powder material is selected from an inorganic or organic material. In the present embodiment, an atomized ferrous powder having an average diameter of 20 μm is utilized as the powder material.

Each of the cured layer 20 has a planer configuration which is determined by a three-dimensional CAD data for the object to be manufactured, and is composed of a high-density cured layer 30 defining an outer shell of the object and a low-density cured layer 40 defining a portion interior of the outer shell. An irradiating condition of the laser or the energy of the light beam is varied to sinter or melt the powder to make the high-density cured layer 30 having a porosity of 5% or less, and the low-density cured layer 40 having a porosity of more than 5%, for example. Thus, the high-density cured layer 30 gives a smooth surface as a result of the powder being melted nearly completely, while the low-density cured layer 40 becomes porous.

Figure 4:
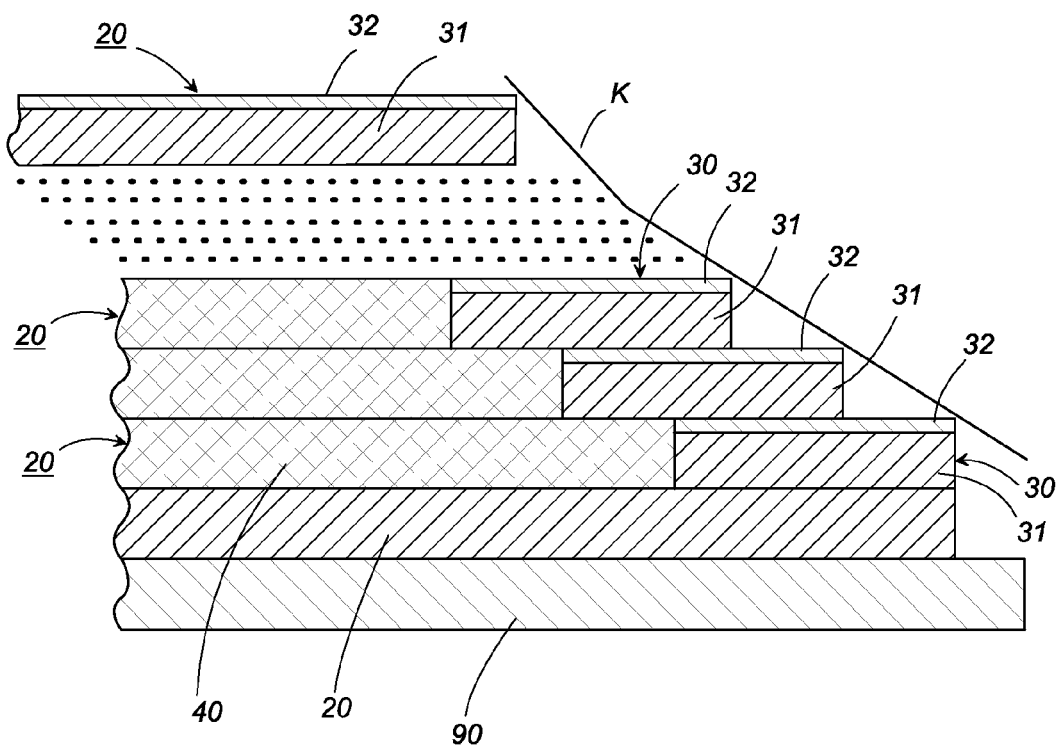
FIG. 4 is an enlarged sectional view showing a part of an inclined surface of the same object.

The process of the present invention is particularly advantageous for fabrication of the three-dimensional object having an inclined face, as shown in FIG. 1, and defines a predetermined range in opposite ends of each cured layer as an outline area constituting the outer shell of the object so as to assign the high-density cured layer 30 to the outline area and assign the low-density layer 40 to a portion confined by the outline area, as shown in FIG. 4.

Figure 2:
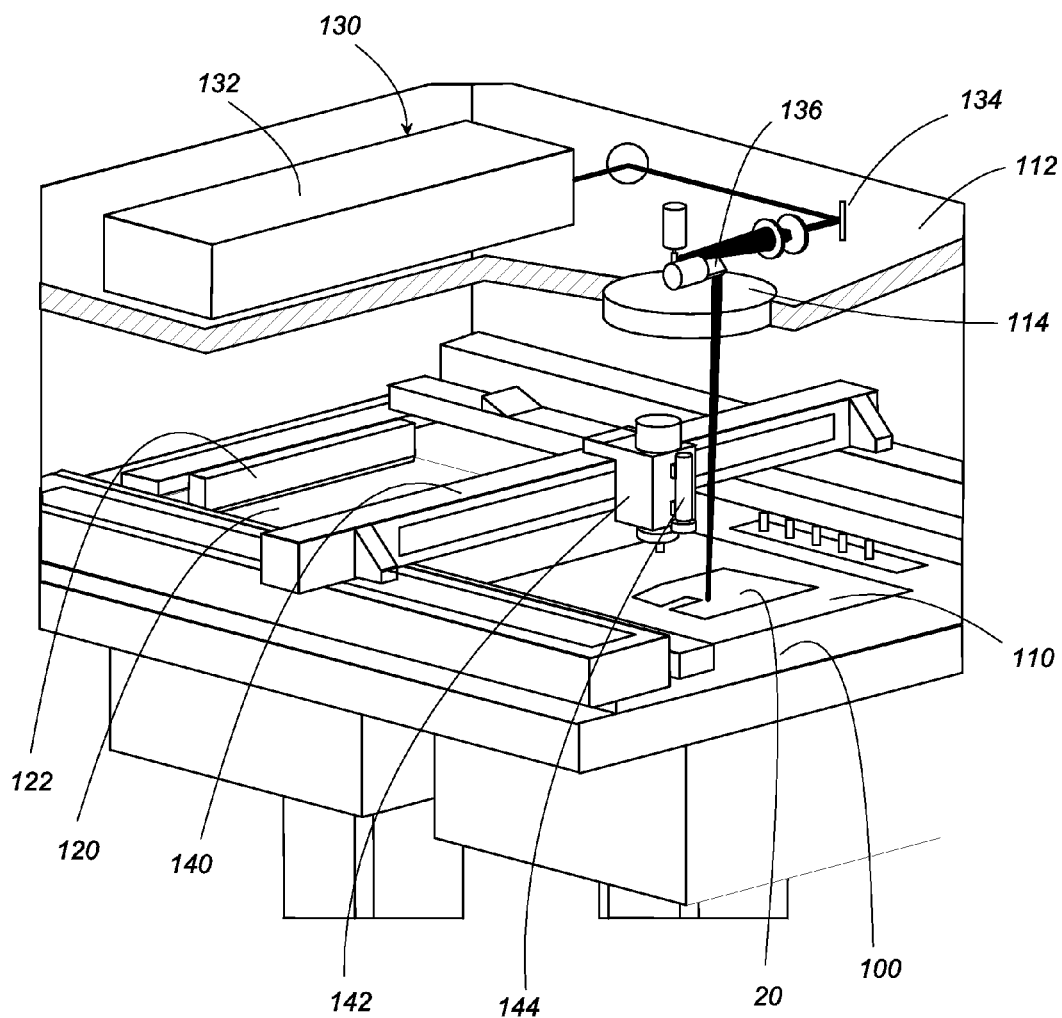
FIG. 2 is a perspective view showing an apparatus for use in the same process.

FIG. 2 illustrates a fabrication system utilized to realize the process of fabricating the three-dimensional object of the present invention. The system includes a table 100, an elevation stage 110 on which the cured layers 20 are formed, a tank 120 for storing the powder, a blade 122 for supplying the powder onto the elevation stage 110, and an radiation device 130 configured to irradiate the light beam to the powder supplied on the elevation stage 110. The elevation stage 110 is driven by a stepper to move along a vertical direction (Z-axis) by a pitch equal to a thickness of the powder layer 10 so as to be supplied with the powder material when it is lowered to a position one step lower than the surface of the table 100. Thereafter, the powder material is smoothed by the blade 122 to form the powder layer 10 of uniform thickness on a metal base 90 disposed on the elevation stage 110 or the already formed cured layer 20 superimposed thereon. The powder layer 10 is prepared to have a thickness of 0.05 mm.

The radiation device 130 is configured to direct the light beam from a laser oscillator 132 to the powder layer 10 by way of an optics including a gulvano-mirror 134 and a scan mirror 136 for irradiating the light beam to the powder layer 10 through a window 114 in a partition 112 disposed above the table 100. The window 114 is realized by a planar plate of Zn—Se when the laser oscillator 132 generates the $CO_2$ laser.

The radiation device 130 receives the three-dimensional CAD data of the object and drives the scan mirror 136 to irradiate the light beam to the powder layer 10 in a pattern determined by the CAD data.

The table 100 is additionally provided with a horizontal moving mechanism 140 moving in X-Y directions and carrying a milling cutter 142 and a CCD camera 144. The milling cutter 142 is employed for cutting the object during or after fabrication thereof. The CCD camera 144 is for monitoring the fabrication process.

Figure 3:
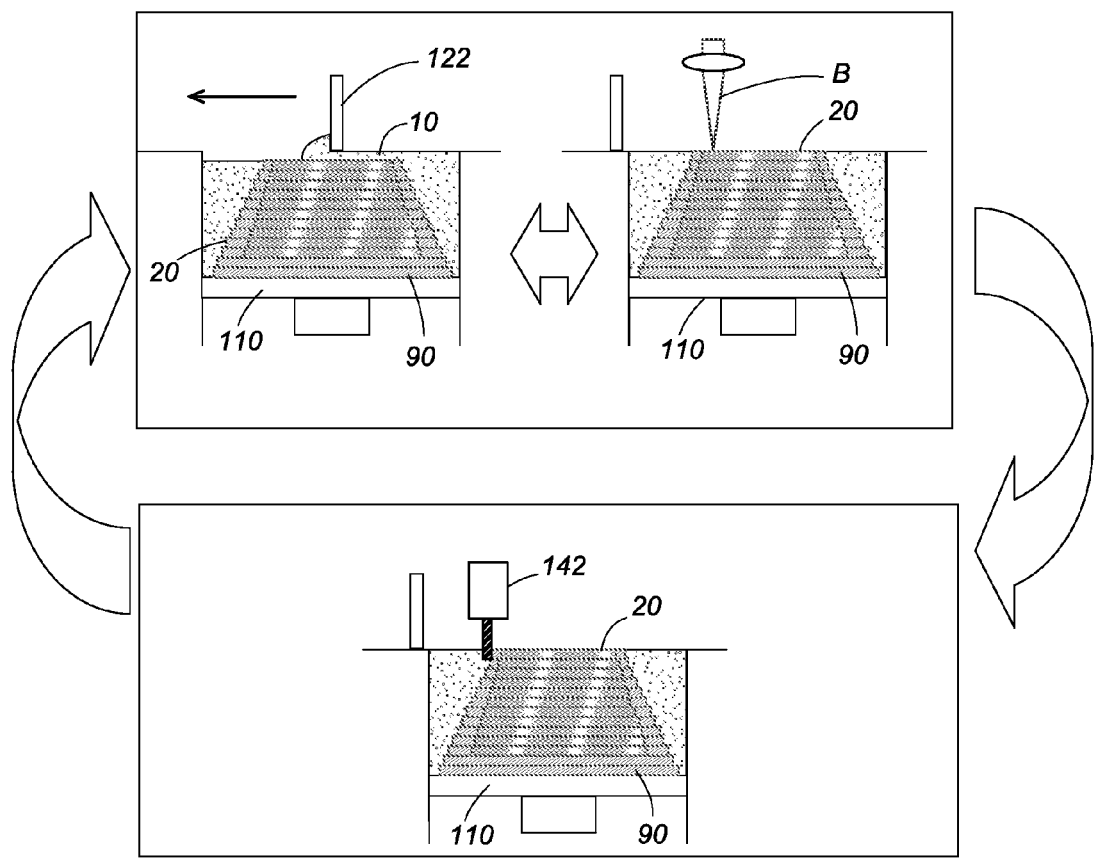
FIG. 3 schematically illustrates the same process.

As shown in FIGS. 1 and 3, the object X is fabricated by successively superimposing the cured layers 20 on the metal base 90 on the elevation stage 110, and is surface-finished during or after the fabrication process by the milling cutter 142. The cured layer 20 formed immediately on the metal base 90 and integrated thereto is cured entirely at a high density, while each of the successively superimposed cured layers 20 is cured at a high density at the outline area constituting the outer shell of the object, and is cured at a low density at a remaining area. The cured layer 20 forming the uppermost layer of the object X is cured entirely at the high-density.

As shown in FIGS. 4 and 5, the high-density cured layer 30 formed in the end of the cured layer 20 except the lowermost one is formed as a laminate composed of a primary high-density cured layer 31 obtained by a primary irradiation of the light beam and a secondary high-density cured layer 32 which is obtained through steps of supplying the powder material to the primary high-density cured layer 31 without lowering the elevation stage 110 to form a supplemental powder layer 12, and making a secondary irradiation of the light beam to the supplemental powder layer 12. The cured layer 20 constituting at least the inclined side surface is configured to have the high-density cured layer 30 in the outline area at the ends of the layer, and have the low-density cured layer 40 in the other area confined by the outline area. The line (K) in FIG. 4 denotes an inclined angle of the inclined side face, and the high-density cured layers 30 of the individual cured layers 20 are arranged along the angled line. With reference to FIG. 5, an explanation is made to fabrication steps of the cured layers 20, i.e., those each necessitating the high-density cured layer 30 not overlapped with the subsequently superimposed cured layer 20. First, the powder layer 10 of a uniform thickness is prepared on the already formed cured layer 20 (FIG. 5A), followed by the primary irradiation of the light beam being made to the outline area constituting the outer shell of the object X to form the high-density primary cured layer 31 (FIG. 5B). With the elevation stage 100 is held in the current position, a fresh amount of the powder material is supplied to a recess formed on the high-density primary cured layer 31 of which height is reduced by curing due to the sintering or melting, thereby forming a supplemental powder layer 12 of uniform thickness on the high-density primary cured layer 31 (FIG. 5C), followed by the secondary irradiation being made to the supplemental powder layer 12 to form the high-density secondary cured layer 32 (FIG. 5D). Thereafter, the light beam is irradiated to an unsintered or unmelted area confined by the outline area to form the low-density cured layer 40 (FIG. 5E). The above steps are repeated to superimpose a plurality of the cured layers 20 to define the shape of the inclined surface of the object X by the ends of the cured layers 20. The entire area of the uppermost layer of the object X is formed by the high-density primary cured layer 31 and the high-density secondary cured layer 32. In the illustrated embodiment, each of the cured layers 20 is obtained by forming the low-density cured layer 40 after forming the high-density secondary cured layer 32. However, it is equally possible to control the irradiation of the light beam alternatively in order to form the low-density layer 40 first and then form the high-density secondary cured layer 32. Further, the high-density primary cured layer 31 can be formed after the formation of the low-density cured layer 40.

Figure 6:
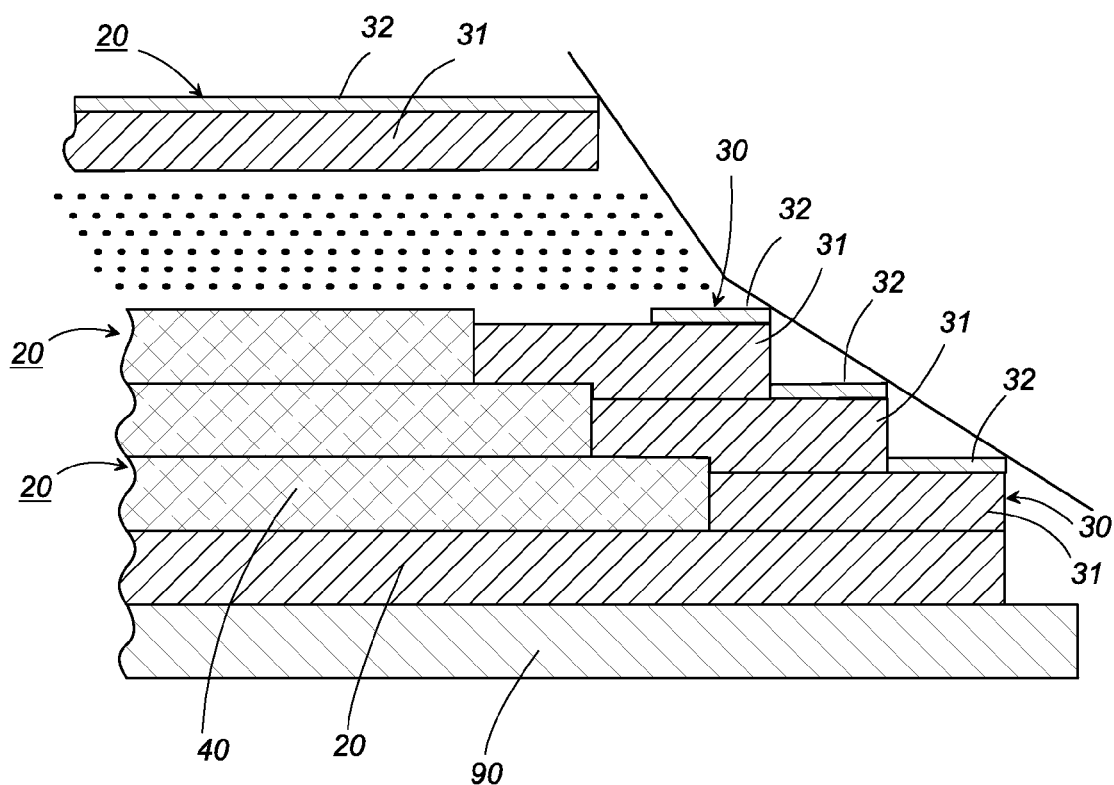
FIG. 6 is an enlarged sectional view showing a part of an inclined surface of an object in a modification of the same process.
Figure 7:
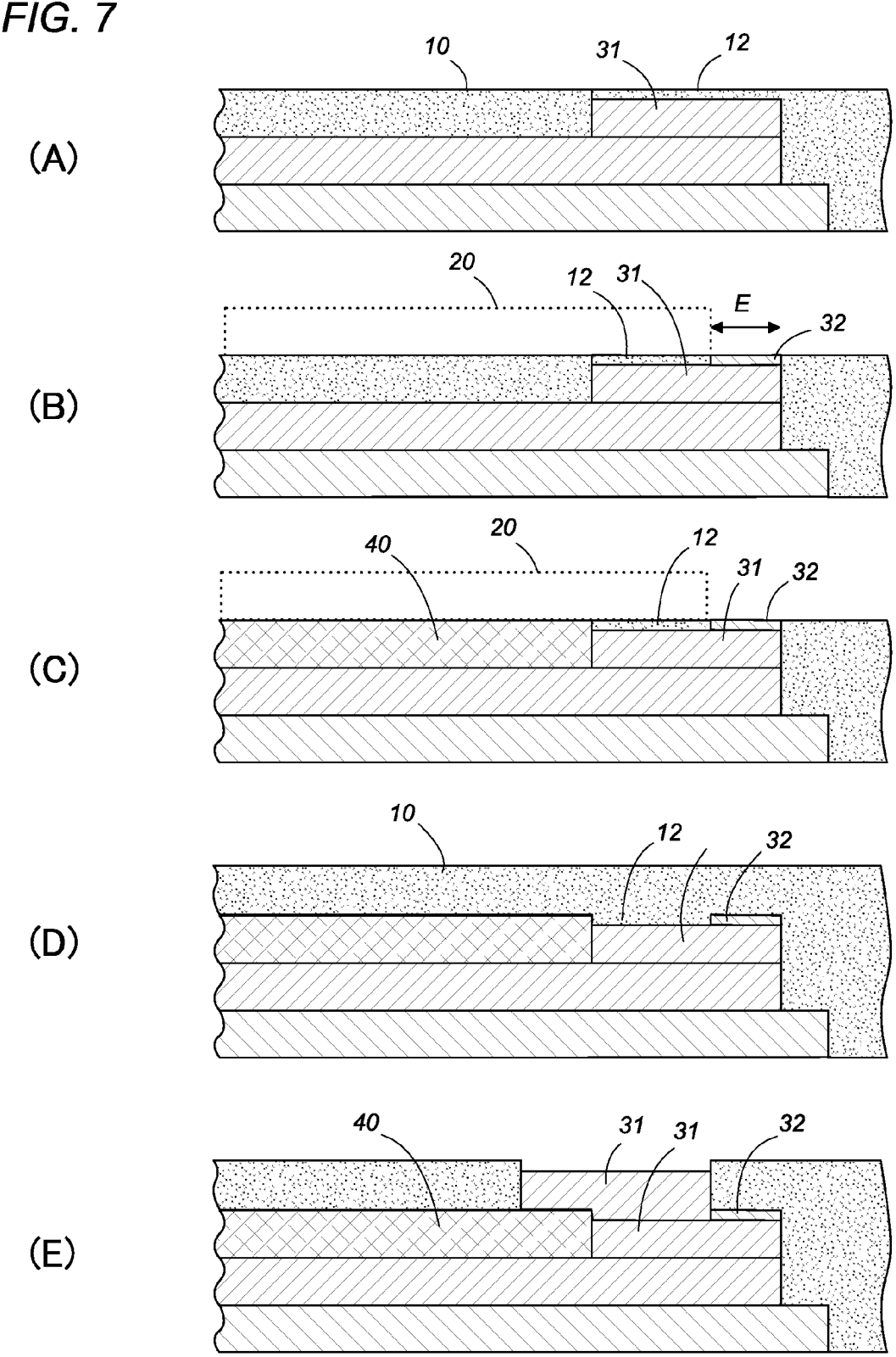
FIGS. 7(A), 7(B), 7(C), 7(D) and 7(E) are enlarged sectional views each showing a step of forming the inclined surface in the same modification.

FIGS. 6 and 7 illustrate a modification of the above embodiment in which the high-density secondary cured layer 32 is formed only to an exposed outer portion of each cured layer 20 defining the inclined surface of the object X. The other portion of the outline area is cured by the primary irradiation of the light beam together with the high-density primary cured layer 31 of the subsequently superimposed cured layer 20. In this instance, it is possible to minimize the time required to make the secondary irradiation of the light beam for the formation of the high-density secondary cured-layer 32, permitting the fabrication of the object X in a short time. The details of the modification are explained with reference to FIG. 7. After preparing the supplemental powder layer 12 on the high-density primary cured layer 31 (FIG. 7A), the secondary irradiation of the light beam is made to the supplemental powder layer 12 not overlapped with the subsequently superimposed cured layer 20 to form the high-density secondary cured layer 32 (FIG. 7B), then the light beam is irradiated to the powder layer 10 confined by the outline area to form the low-density cured layer 40 (FIG. 7C). In this condition, the elevation stage 110 is lowered by one step such that afresh powder layer 10 is formed to merge with the uncured supplemental powder layer 12 (FIG. 7D), followed by the primary irradiation of the light beam is made to the outline area of the powder layer 10 to form the high-density primary cured layer 31 (FIG. 7E). The high-density primary cured layer 31 is integrated and continuous with the lower primary cured layer 31. The above steps are repeated to realized the structure of FIG. 6.

Figure 8:
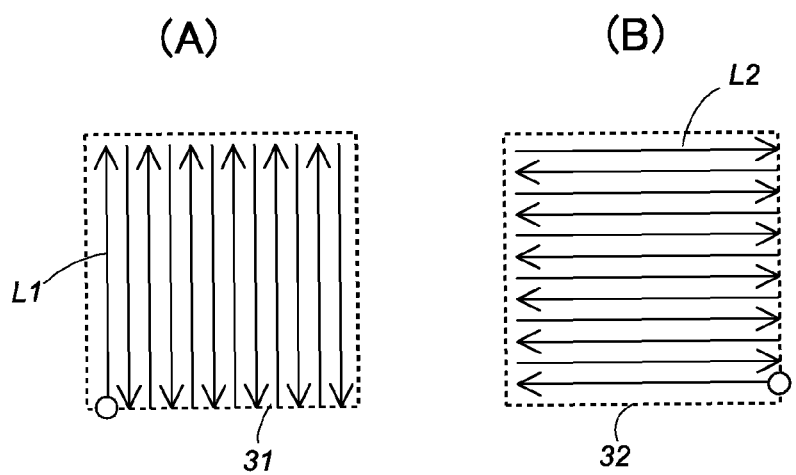
FIGS. 8(A) and 8(B) illustrate a light beam scanning method in the same process.
Figure 9:
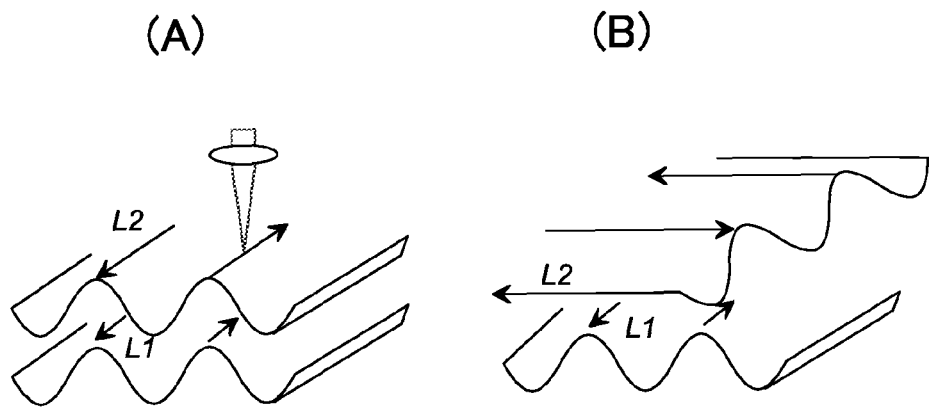
FIGS. 9(A) and 9(B) illustrate a light beam scanning method in the same process.

As shown in FIGS. 8A and 8B, the light beam of the primary irradiation is scanned in a different direction, preferably a perpendicular direction to the direction in which the light beam of the secondary irradiation is scanned. Thus, the energy is given uniformly to sinter the target area for developing smooth surface configuration of less irregularity. The light beam is scanned along parallel spaced lines to give an energy distribution as shown by a sinusoidal curve in FIG. 9. When the primary irradiation L1 and the secondary irradiation L2 are made in the same direction, the energy distributions respectively for sintering the high-density primary cured layer 31 and the high-density secondary cured layer 32 are overlapped with each other, as shown in FIG. 9A. In this instance, the high-density primary cured layer sees in its surface a nearly completely melted portion as well as no such portion such that the energy of the secondary irradiation L2 is consumed to melt the powders that have not yet melted in the surface of the high-density primary cured layer 31. Therefore, when the energy distribution of the secondary irradiation L2 overlaps with that of the primary irradiation L1, the secondary irradiation L2 is absorbed and consumed in the not substantially completely melted powders in the upper surface of the high-density primary cured layer 31 so as to suffer from shortage of the energy in obtaining the corresponding high-density secondary cured layer 32, leaving unmelted portion in the surface of the high-density secondary cured layer 32 and causing undue irregularities. In contrast, when the secondary irradiation L2 is scanned in the direction perpendicular to that of the primary irradiation L1, there is obtained an energy distribution as shown in FIG. 9B, which permits the secondary irradiation L2 to give sufficient energy to the not substantially completely melted powders in the upper surface of the high-density primary cured layer 31, and therefore retains the energy for sintering the high-density secondary cured layer 32. Thus, the powders in the resulting high-density secondary cured layer 32 can be nearly completely melted to give a smoothly finished surface.

In view of that the primary irradiation L1 and the secondary irradiation L2 are intended for sintering or melting the powder layers of different thickness, the total energy of the light energy is different from each other. Nevertheless, the radiation device 130 is controlled to keep a constant energy per unit volume of the powder and per unit time so as to give an identical energy for making the high-density primary cured layer 31 and the high-density secondary layer 32 to have the same density. In order to make this control, the radiation device 130 or an external device for controlling the same is configured to have a data table which determines a data indicative of a relation between the volume of the outline area in each of the cured layers 20 and an expected lowered amount (settle amount δ) of the high-density primary cured layer obtained by the primary irradiation, and a data giving the light energy of the secondary irradiation necessary to sinter or melt the supplemental powder layer having the thickness corresponding to the settle amount δ, enabling the control of giving the constant light energy per unit volume and per unit time for the primary and secondary irradiations. It is possible to measure the settle amount δ of the high-density primary cured layer 31 by use of a probe.

The energy density Eρ is expressed in terms of a light beam power (P), a light beam scanning velocity (v)<mm/s>, a light bean scanning pitch (pf)<mm>, the settle amount (δ)<mm>, a stacking pitch (t)<mm> so that the energy density of the primary irradiation L1 is obtained by a relation Eρ1=P/(v·pf·t), and that of the secondary irradiation L2 is obtained by a relation Eρ2=P/(v·pf·δ). Conditions are determined to equalize Eρ1 with Eρ2.

Figure 10:
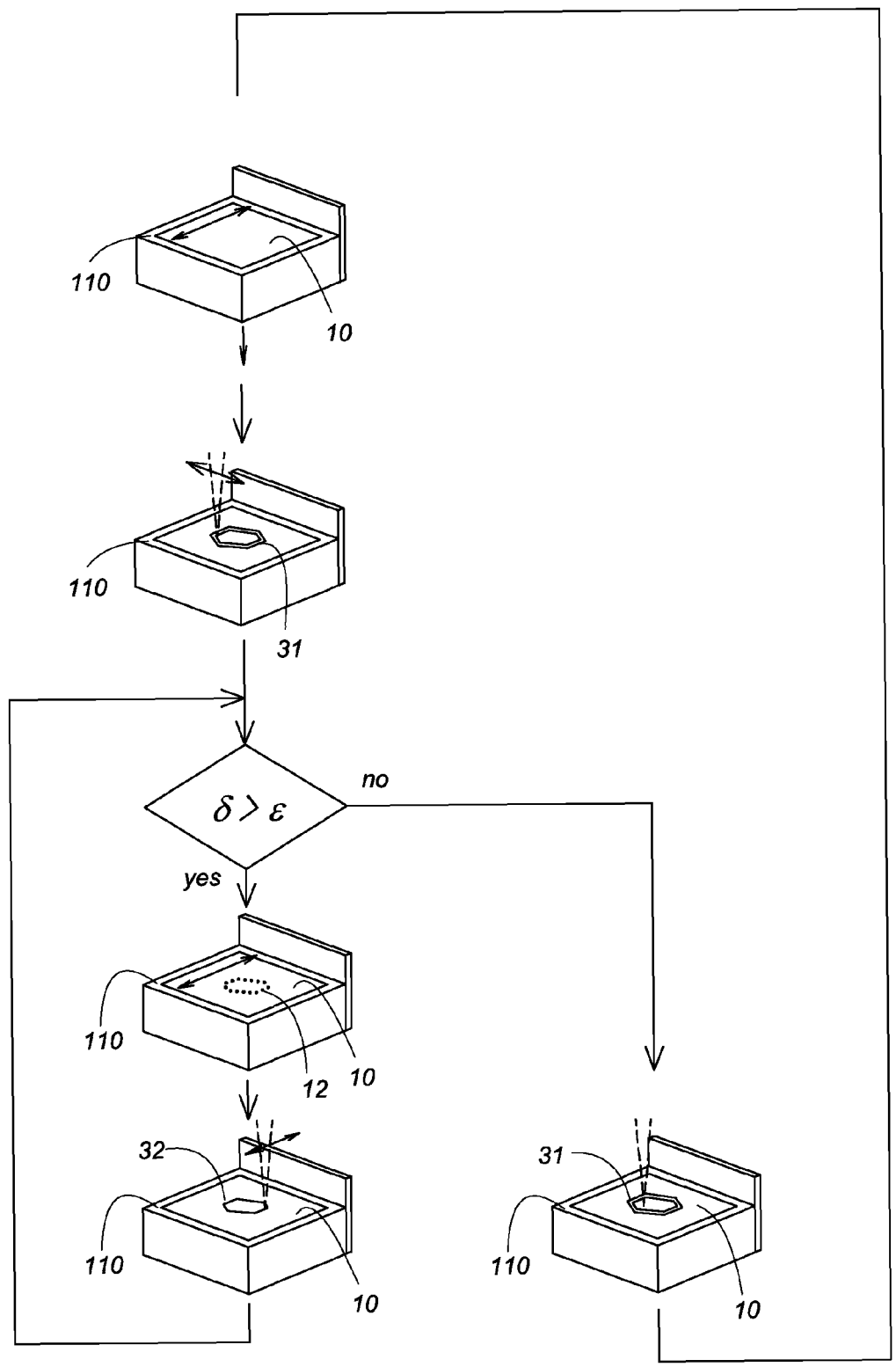
FIG. 10 is a flowchart showing a fabrication procedure of the same process.

When obtaining the settle amount (δ) by measurement, each of the cured layers 20 may be formed by making the current high-density primary cured layer 31 continuous with the subsequently formed high-density primary cured layer 31 without forming the high-density secondary cured layer 32 therebetween provided that the current primary cured layer 31 sees the settle amount (δ) which is less than a predetermined value (ε). FIG. 10 illustrates a flow of this instance in which the elevation stage 110 is held at the position when the settle amount (δ) exceeds the predetermined value (ε) so that the powder material is supplied on the high-density primary cured layer 31 to develop thereat the high-density secondary cured layer 32. Otherwise, the elevation stage 110 is lowered by one step, so that the fresh powder material is supplied to prepare the powder layer 10 on the lower low-density cured layer and the high-density primary cured layer for sintering or melting the same.

When measuring the settle amount (δ), a touch probe is used for example as being attached to the milling cutter 142 and is brought into contact with a portion of the high-density primary cured layer 31 in accordance with a cross-sectional data of the object, for measuring the height of the layer. Besides, a light sectioning scheme may be relied upon to give a height analysis of the entire surface, or an optical scheme using a laser distance meter may be relied upon to measure a distance to the surface of the high-density primary cured layer 31. Further, it is equally possible to rely upon a torque which the blade 122 comes into contact with the cured layer while supplying the powder for determining whether or not the high-density secondary cured layer 32 is required. When the high-density primary cured layer 31 is settled substantially, the blade 122 is out of contact therewith to see no increased torque. When, on the other hand, the high-density primary cured layer exhibits only small settling, the blade 122 comes into contact therewith and sees a dragging resistance. Thus, the necessity of forming the high-density secondary cured layer 32 can be determined based upon the torque being applied to the blade.

Further, it is possible to determine the supplying amount of the powder for the supplemental powder layer 12 in accordance with the settle amount (δ) of the high-density primary cured layer 31. Using a power supply surface area (ST) on the elevation stage 110, the settle amount (δ) of the high-density primary cured layer 31, a surface area (Sh) of the high-density primary cured layer, and the stacking pitch (t), a control for supplying an optimum powder supply amount can be made with an initial powder supply amount (V1=ST·t), and a supplemental powder supply amount (V3=Sh·δ) for the supplemental powder layer 12 which forms the high-density secondary cured layer 32.

Figure 11:
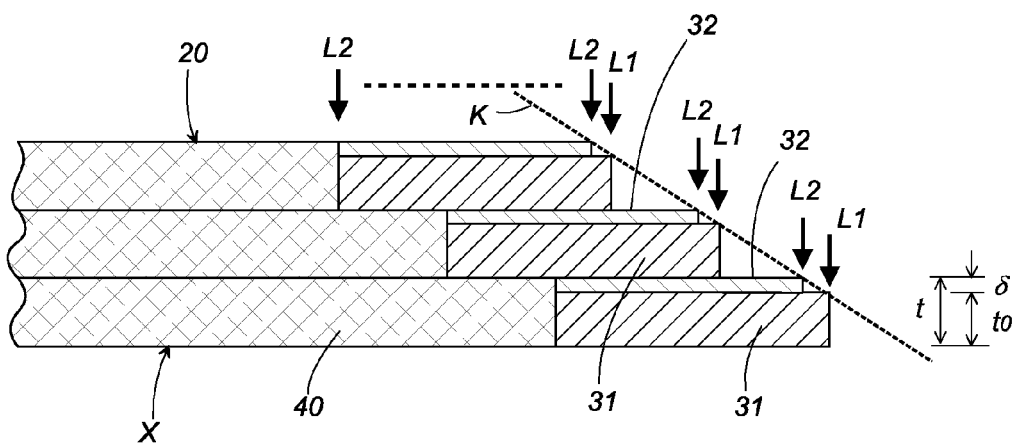
FIG. 11 is an enlarged sectional view showing another modification of the same process.
Figure 12:
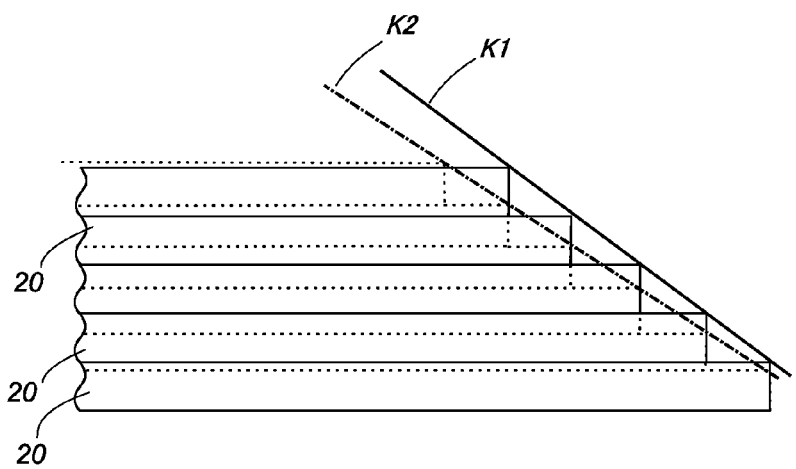
FIG. 12 illustrates a problem of a conventional process of fabricating a three-dimensional object.

FIG. 11 illustrates another modification of the above embodiment which proposes a method of fabricating the object having more accurately surface configuration by slicing out the CAD data with more precise contour lines based upon the expected or measured settle amount (δ) of the high-density primary cured layer 31. For this purpose, the location of the primary irradiation L1 forming the edge of the high-density primary cured layer 31 within the X-Y coordinate plane is offset from that of the secondary irradiation L2 forming the edge of the high-density secondary cured layer 32. That is, the primary irradiation L1 and the secondary irradiation L2 are controlled to give different irradiation ranges in dependence upon the settle amount (δ), so as to realize the inclined surface in accurate conformity with the inclined angle (K) of the object. The range for the primary irradiation L1 is determined from the sectional configuration of the CAD data of the object at a height position (t0=t−δ), i.e., the position of the stacking pitch (t) (the one lowered step of the elevation stage 110) minus the settle amount (δ), while the range for the secondary irradiation L2 is determined from the sectional configuration of the CAD data of the object at the height position (t).

After or during the fabrication of the object X, the milling cutter 142 is activated to finish the external configuration as necessary. In this instance, since the high-density cured layer constituting the inclined surface of the object X is composed of the high-density primary cured layer 31 and the high-density secondary cured layer 32 which are formed separately by the primary irradiation and the secondary irradiation, respectively, the inclined surface of the object can accurately reflect the design of the object, which enabling to minimize an amount of polishing by use of the milling cutter and therefore to fabricate the object at an improved efficiency.

Although the above embodiment illustrates the use of the ferrous powder as the powder material, the present inventions should not be limited thereto and can well use other inorganic material or organic powder materials such as nylon and ABS resin.

The invention claimed is:

1. A process of fabricating a three-dimensional object, said process comprising the following sequential steps of:
   a) providing a powder layer made of a powder material to have a uniform thickness;
   b) irradiating a light beam to a selected portion of said powder layer to sinter or melt said selected portion into a cured layer;
   c) providing an additional powder layer on said cured layer;
   d) irradiating said light beam to a selected portion of said additional powder layer to form an additional cured layer consolidated with said cured layer; and
   e) repeating the steps of c) and d) in order to stack said cured layers to provide said three-dimensional object,
   wherein said cured layer comprises a first cured portion and a second cured portion having a lower density than said first cured portion,
   wherein a vertically movable elevation stage is utilized to hold said cured layer, said elevation stage being lowered before every step of c) so as to be supplied with said powder material, thereby forming thereon the powder layer of uniform thickness, and
   wherein said process is further characterized by the following sequential steps of:
   i) making a primary irradiation of irradiating said light beam to an outline area of at least one of said powder layers forming an outer shell of said three-dimensional object in order to form a primary cured layer as a part of said first cured portion;

ii) supplying an extra amount of said powder on top of said primarily cured layer of which thickness is reduced as a result of being cured with the elevation stage kept in the same level as in said step i), so as to provide a supplemental powder layer of a uniform thickness on said primary cured layer;

iii) making a secondary irradiation of irradiating said light beam to at least one portion of said supplemental powder layer in order to form a secondary cured layer as a part of said first cured portion, said secondary cured layer consolidated to said primarily cured layer; and iv) irradiating said light beam to a remaining portion of said powder layer confined by said outline area and not converted into said primary cured layer in order to form a low-density cured layer as said second cured portion.

2. A process of fabricating a three-dimensional object as set forth in claim 1, wherein
said secondary irradiation is made to irradiate said light beam only to a portion of said supplemental powder layer not overlapping with a subsequently cured layer superimposed thereon so as to form said high-density secondary cured layer, and said primary irradiation is made to consolidate the portion of said supplemental powder layer overlapping with the subsequently superimposed cured layer into said high-density primary cured layer in said subsequently superimposed cured layer together with a powder layer supplied on said supplemental powder layer for the formation of said subsequently superimposed cured layer.

3. A process of fabricating a three-dimensional object as set forth in claim 1, wherein
said powder material is supplied onto said primary cured layer with said elevation stage kept in the fixed level in order to prepare said supplemental powder layer of which top surface is in level with that of not-yet-sintered or not-yet-melted powder layer confined by said outline area.

4. A process of fabricating a three-dimensional object as set forth in claim 1, wherein
said primary irradiation and said secondary irradiations are made to scan said light beams respectively in directions crossing with each other.

5. A process of fabricating a three-dimensional object as set forth in claim 1, wherein
each said primary irradiation and said secondary irradiations is made by said light beam with an irradiation energy which is constant per unit time as well as per unit volume of the powder being sintered or melted.

6. A process of fabricating a three-dimensional object as set forth in claim 1, wherein
for the formation of the cured layer not overlapping with the subsequently superimposed cured layer, the light beam is irradiated to said high-density primary cured layer over an irradiation range which is different from an irradiation range over which the light beam is irradiated to form said high-density secondary cured layer, and
said individual irradiation ranges are determined by a settling thickness which is the thickness of the powder layer minus the thickness of said primary cured layer.

7. A process of fabricating a three-dimensional object as set forth in claim 2, wherein
said primary irradiation and said secondary irradiations are made to scan said light beams respectively in directions crossing with each other.

8. A process of fabricating a three-dimensional object as set forth in claim 2, wherein
each said primary irradiation and said secondary irradiations is made by said light beam with an irradiation energy which is constant per unit time as well as per unit volume of the powder being sintered or melted.

9. A process of fabricating a three-dimensional object as set forth in claim 2, wherein
for the formation of the cured layer not overlapping with the subsequently superimposed cured layer, the light beam is irradiated to said high-density primary cured layer over an irradiation range which is different from an irradiation range over which the light beam is irradiated to form said high-density secondary cured layer, and
said individual irradiation ranges are determined by a settling thickness which is the thickness of the powder layer minus the thickness of said primary cured layer.

10. A process of fabricating a three-dimensional object as set forth in claim 1, each of said primary cured layer and said secondary cured layer having a porosity of 5% or less, said low-density cured layer having a porosity of more than 5%.

* * * * *